P. ENGLISH.
ROTARY FLUID TRANSMITTER.
APPLICATION FILED JULY 13, 1910.
1,007,933.
Patented Nov. 7, 1911.
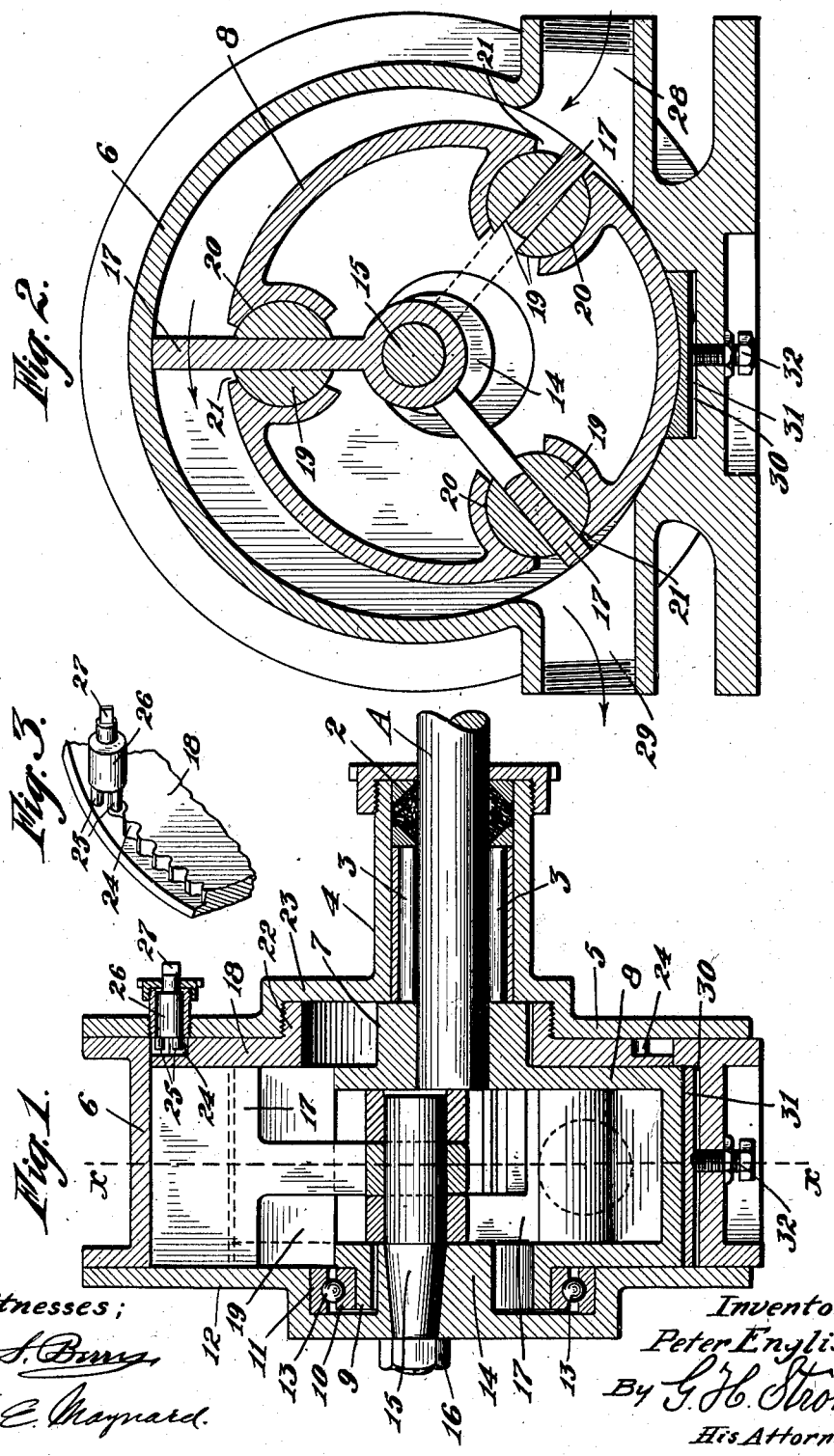
Witnesses;
Inventor
Peter English
By G. H. Strong.
His Attorney.

UNITED STATES PATENT OFFICE.

PETER ENGLISH, OF SAN FRANCISCO, CALIFORNIA.

ROTARY FLUID-TRANSMITTER.

1,007,933.   Specification of Letters Patent.   Patented Nov. 7, 1911.

Application filed July 13, 1910. Serial No. 571,770.

*To all whom it may concern:*

Be it known that I, PETER ENGLISH, citizen of the United States, residing in the city and county of San Francisco and State of California, have invented new and useful Improvements in Rotary Fluid-Transmitters, of which the following is a specification.

This invention relates to fluid transmitters and particularly pertains to that class of transmitters in which the fluid is moved by wings or blades rotating in connection with an eccentrically mounted drum within a cylindrical casing.

It is the object of this invention to provide a rotary device of the above description which is simple in construction and operation, and in which means are provided for taking up wear of the drum within the casing, and means by which backflow will be prevented where the pump is operating against a head of considerable pressure.

The invention consists of the parts and the construction and combination of parts as hereinafter more fully described and claimed, having reference to the accompanying drawings, in which—

Figure 1 is a longitudinal vertical section of the invention. Fig. 2 is a transverse section on the line X X, Fig. 1. Fig. 3 is a detail in perspective showing the manner of actuating the take-up disk.

In the drawings A represents a drive shaft, by which the drum is operated, and which may be rotated by any suitable power. This shaft A passes through a stuffing-box 2 and is supported upon roller bearings 3 mounted within a tubular extension 4 formed on a cover plate 5 which closes one end of a cylindrical casing 6 within which the operative parts of the pump are mounted, the shaft A extending into the cylinder 6 eccentric to the axial line thereof, and the casing being stationary.

Rigidly secured upon the inner end of the drive shaft A is a hub 7 of a hollow drum 8, upon the opposite side of which is formed a hub 9 carrying a raceway 10, and which revolves within a bearing 11 mounted in a cover-plate 12 on the other end of the cylinder 6. Ball bearings 13 are interposed between the raceway 10 on the hub 9 and the bearing 11 on the cover-plate 12, so as to reduce the friction at this point.

An inwardly extending boss 14 is formed on, and eccentric to, the center of the cover-plate 12 and projects within the hub 9 of the drum 8; and mounted in the boss 14 is a pin 15 which extends through the drum 8 nearly to the opposite wall thereof, the pin 15 being disposed on the axial line of the cylinder 6 and eccentric to the axial line of the hollow drum 8. From the foregoing it will be seen that the drive shaft A, drum 8, hubs 4—14, and the bearing 11 are coaxial with each other, and eccentric to the cylinder 6, while the pin 15 is concentric to said cylinder. The pin 15 is tapered at the point where it passes through the boss 14 and is securely held in place by means of a nut 16 which is screwed on its outer end.

Upon the pin 15 and within the drum 8 are pivoted the inner ends of three wings or vanes 17; each wing having a wide head extending between the cover-plate 12 on one side and a take-up plate 18 on the other side. That is to say, the wide portions of the wings 17 are equal to the width of the drum 8, as the flat sides of the latter contact with the cover-plate 12 and the take-up plate 18, as shown in Fig. 1. The wings 17 are radially disposed in the drum 8 and are slidable between approximately semi-cylindrical gibs 19 which can rock in corresponding recesses 20 formed transversely through the drum near its periphery. These recesses 20 have enlargements 21 in the form of slots appearing on the periphery and on the interior of the drum 8, and through which the wings 17 extend, as shown in Fig. 2. These slots 21 permit the wings to oscillate in the movement of the drum, as hereinafter appears. The gibs 19 serve two purposes. They support the ends of the wings in their proper position, while permitting them to have an oscillating movement, and they serve to make a fluid-tight joint at the parts where the blades pass through the circumference of the drum.

The take-up plate 18 is mounted in the casing 6 in the following manner: A hub 22 is formed on the back of the plate 18 and is screw-threaded on its outer surface. A hollow, cylindrical extension 23 is formed on the cover-plate 5 and is threaded on its inner surface so that the hub 22 on the plate 18 may be screwed into the part 23. Gear teeth 24 are formed on the outer edge of the periphery of the take-up plate 18, as shown in Fig. 3, which are adapted to be engaged by a pair of spurs or pins 25 on a spindle 26 revolubly mounted in the cover-plate 5. The spindle 26 is provided with a wrench-hold 27 on its outer end, by which it may be turned to rotate the take-up plate 18 and thus move it backward or forward on its threaded bearing. Intake and discharge openings 28—29 are provided in the cylinder 6 on opposite sides and a short distance above the bottom thereof, as shown in Fig. 2.

In the part of the inner surface of the cylinder 6 which is nearest the center of the drum 8, and between the intake and discharge orifices 28—29 there is formed a cavity or socket 30 extending the full width of the drum 8. The drum 8 is so mounted that its outer periphery will extend a short distance into the socket 30, so that it will fall beyond or overlap the inner periphery or surface of the cylinder 6. This feature of construction is important, as it causes the outer edges of the wings 17 to come within the outer surface of the drum 8 at this point when the drum is revolved. An abutment block 31 is mounted in the socket 30, the inner surface of which is made cylindrical to fit snugly against the arcual surface of the drum 8, which rotates in contact therewith. A set screw 32 bears against the back of the block 31, which can be screwed up from time to time and thus keep the block in contact with the drum and take up the wear on the block.

Since the inner surface of the abutment block 28 accurately conforms to the surface of the drum 8, the latter can, between the intake and discharge ports 28—29, revolve in close contact with the inner surface of the abutment block; and, owing to the eccentric location of the pin 15, upon which the inner ends of the wings 17 are pivoted, it results in the outer end of each wing, in traveling over the above-mentioned surface between the intake and discharge openings by said eccentricity and the overlap of the outer periphery of the drum, being withdrawn inwardly within the surface of the drum, as before described, by reason of the outer end of each wing following at all times the circle of the inner surface of the cylinder 6. It is thus provided that the outer ends of the wings 17 can never come in contact with the abutment block 31 and cause a jar, shock or vibration, as would occur if such contact took place.

The operation of the invention is as follows: The shaft A on being rotated causes the drum 8 to revolve in the cylindrical casing 6, which is fixedly mounted on any suitable support. The rotation of the drum 8 causes the wings or vanes 17 to travel therewith, which by reason of being pivotally mounted eccentric to the drum 8 are caused to slide back and forth between the gibs 19, the gibs permitting of the necessary oscillation taken by the wings 17 in the course of their travel. The outer edges and sides of the wings 17 being in close contact with the inner walls of the cylinder 6 at all times, a suction is created as each blade passes the intake opening 28. This causes the fluid to be moved to enter the casing 6 behind a blade 17, and it is carried around the passage between the outer surface of the drum 8 and the inner surface of the casing 6 by the blade following, to be finally discharged through the opening 29. The abutment block 31 being kept in close contact with the drum 8 prevents any back-flow of the fluid being moved, and thus enables the intake and forcing of the fluid out the discharge opening 29 against great pressure.

It is obvious that the drum 8 may be rotated in either direction so as to discharge through either the opening 28 or 29.

Having thus described my invention, what I claim and desire to secure by Letters Patent is—

1. The combination in a device for moving fluids, of a stationary cylindrical casing having alined inlet and discharge passages near one side, a revoluble drum eccentrically mounted in said casing, wings or vanes pivotally mounted concentrically in the casing and radially slidable in said drum, means for taking up the wear of the sides of the wings and drum, said means comprising a wear-compensating plate turnably mounted on one end and inside of said casing having a hub portion threaded into engagement with the corresponding portion of the casing, and means for rotating the plate from the exterior of said casing.

2. The combination in a fluid transmitting device, of a stationary cylindrical casing with inlet and discharge openings, an eccentrically journaled, revoluble drum with radially slidable vanes pivoted concentrically within the casing, a threaded wear plate within the cover plate of the casing, said plate having peripheral teeth, and a turnable shaft or spindle having pins or teeth adapted to engage the teeth of the wear plate to revolve and advance it.

In testimony whereof I have hereunto set my hand in the presence of two subscribing witnesses.

PETER ENGLISH.

Witnesses:
CHARLES H. PENFIELD,
CHARLES EDELMAN.